United States Patent [19]

Grupp

[11] Patent Number: 5,037,185

[45] Date of Patent: Aug. 6, 1991

[54] LIQUID CRYSTAL CELL PROVIDED WITH BUBBLE TRAPS

[75] Inventor: Joachim Grupp, Peseux, Switzerland

[73] Assignee: Asulab, S.A., Switzerland

[21] Appl. No.: 403,524

[22] Filed: Sep. 6, 1989

[30] Foreign Application Priority Data

Sep. 7, 1988 [CH] Switzerland ................. 03359/88

[51] Int. Cl.⁵ ................................................ G02F 1/13
[52] U.S. Cl. ............................................ 359/80; 359/81
[58] Field of Search ................... 350/331 R, 343, 344

[56] References Cited

U.S. PATENT DOCUMENTS

| 4,095,876 | 6/1978 | Horsting et al. | 350/343 |
| 4,610,510 | 9/1986 | Funada et al. | 350/343 |
| 4,645,306 | 2/1987 | Akai | 350/344 |

FOREIGN PATENT DOCUMENTS

| 54-107751 | 8/1979 | Japan . | |
| 54-107752 | 8/1979 | Japan . | |
| 0171319 | 10/1982 | Japan | 350/343 |
| 0771319 | 10/1982 | Japan | 350/343 |
| 61-35431 | 2/1986 | Japan . | |
| 61-241730 | 10/1986 | Japan . | |
| 0134627 | 6/1987 | Japan | 350/343 |
| 62-134627 | 6/1987 | Japan | 350/344 |
| 62-299818 | 12/1987 | Japan | 350/343 |
| 63-29730 | 2/1988 | Japan . | |
| 63-289525 | 11/1988 | Japan . | |
| 1-091112 | 4/1989 | Japan . | |
| 0009423 | 7/1989 | Japan | 350/343 |

Primary Examiner—Rolf Hille
Assistant Examiner—Tan Ho
Attorney, Agent, or Firm—Pollock, Vande Sande & Priddy

[57] ABSTRACT

The liquid crystal cell comprises a volume divided by a separating wall into a main chamber and a secondary chamber which define an active surface and a passive surface respectively. The secondary chamber is partially filled with the liquid crystal and with a gas. According to the invention the cell comprises, in addition, compensation means for variations in the volume of the liquid crystal constituted by a secondary chamber divided into a plurality of compartments, a plurality of passage openings being provided in the separating wall so that the main chamber and the secondary chamber are intercommunicating.

21 Claims, 5 Drawing Sheets

LIQUID CRYSTAL CELL PROVIDED WITH BUBBLE TRAPS

BACKGROUND OF THE INVENTION

The invention relates to a liquid crystal cell provided with bubble traps designed to avoid bubble formation in the active surface of the cell during substantial variations in the volume of the liquid crystal caused, for example, by temperature fluctuations, notably for liquid crystal cells of the super twisted nematic (STN), dichroic, ferroelectric or analogous types.

DESCRIPTION OF THE PRIOR ART

Liquid crystal cells are generally composed of a liquid crystal film interposed between two plates of glass each covered with electrodes on their facing sides. These plates are joined together by a sealing frame extending along the latters' circumference. The sealing frame defines, on the one hand, a tight chamber in which the liquid crystal film is contained and, on the other hand, a gap (of the order of 5 to 9 μm) as well as a suitable electric insulator between the two plates.

Cells of this type present a number of problems, both during manufacture and use.

The first problem arises when the cell is filled with liquid crystal. Filling has to be carried out in such a way that all pollution, such as dust, bubbles, etc. is avoided.

Classically, the cell is filled by immersion of the latter in the liquid crystal, the cell having first been subjected to a high vacuum, on the side with an opening provided in the sealing frame. Unfortunately this filling technique leads to the formation of gas bubbles causing a visible fault in the cell, particularly in large cells. Moreover, some liquid crystal mixtures comprise volatile components which evaporate when subjected to very low pressures, thereby modifying the composition of the liquid crystal In the case of mixtures of this type it is therefore impossible to use pressures of this type during filling As a result, gas bubbles form.

In order to overcome this disadvantage, JP 59-156,947 discloses a substantially rectangular liquid crystal display cell comprising an additional inner frame defining with the sealing frame a secondary chamber in addition to the main chamber which defines the active surface of the cell. These two chambers communicate with one another by a single passage opening at the opposite side of the filling opening. The secondary chamber defines a passive surface and is designed to trap the gas bubbles appearing during filling in order to eliminate them from the active surface.

This solution is, however, unsatisfactory. When the liquid crystal is introduced into the cell through the filling opening, the liquid crystal presents a convex filling profile due to the laws of flow with the result that, as soon as the liquid crystal reaches the passage opening there is, in each corner of the main chamber arranged on either side of the aforementioned opening a gas residue which produces a visible fault in the surface of the cell which can easily move in the main chamber. In addition, it takes a long time to fill cells of this type because of the length of the path which the liquid crystal has to travel to fill the secondary chamber, constituting a not insignificant disadvantage during the mass production of this type of cell.

The second problem arises in connection with the sealing frame of the cell. The sealing frame defining the gap between the two plates must be of constant thickness to maintain the correct parallelism between the two plates in order to obtain a faultless active surface.

It should be noted in this context that a variation of about 0.1 μm in the gap between the plates causes a fault in the surface of the cell visible to the naked eye.

To overcome this problem use is generally made, particularly in the case of large cells, of spacers in the form of balls or fibres of specific diameter, the latter being put into position before the two plates are assembled. However, if the cell is to be used within a wide range of temperatures ($-40°$ C., $+85°$ C.), the coefficient of expansion of the liquid crystal being larger than that of the plates of the cell, the cell distends or contracts, causing a variation in the gap or bubble formation respectively.

An immediate solution would consist in varying the number of spacers per unit of surface in order to enable the volume of the cell to adapt substantially to the variation in the volume of the crystal and thus to reduce if not to avoid bubble formation; however if the cell is subjected to vibrations or external pressures, this may cause variations in the gap between the two plates which impair the display quality of the cell.

A cell described in JP 61-100,587 attempts to approach the solution of the aforementioned problems.

This solution consists in a liquid crystal cell provided with two neighbouring obstacles arranged immediately in front of the filling opening and forming a space communicating with the main chamber of the cell. A gas bubble is deliberately contained whilst the cell is being filled, the volume of this bubble being such that it may vary to compensate for variations in the volume of crystal contained in the cell, when it is subjected to very low temperatures. Nevertheless, the trapping of the bubble is not entirely guaranteed and it is very likely that, if its volume varies considerably, the bubble will leave the space and travel within the main chamber of the cell. It is then no longer possible to control the bubble.

Finally, JP 54-107752 discloses a liquid crystal cell provided with a bubble trap composed of an additional frame, rectangular in shape, which defines a secondary chamber with the sealing frame, the main chamber being defined by the active surface of the cell. These two chambers communicate with each other by the intermediary of two passage openings arranged in two diametrically opposite corners of the inner frame. The cell disclosed in the reference comprises no filling opening and is therefore filled by depositing a liquid crystal drop of a predetermined volume on a plate, and then positioning and sealing the other plate with the former.

Here again, this filling process generates bubbles in the two opposite corners of the inner frame which have no passage opening to the secondary chamber. Moreover, the bubbles posssibly trapped in the secondary chamber move freely therein so that they may leave this chamber in the event of significant temperature fluctuation.

OBJECTS OF THE INVENTION

It is thus a main object of the invention to overcome the disadvantages of the aforementioned prior art by providing a liquid crystal cell, the optical quality of which remains constant over a large range of temperatures and external pressures and which, inter alia, may easily be used in structures subjected to substantial vibrations. An automobile rear view mirror could be taken as an example of a structure of this type.

BRIEF SUMMARY OF THE INVENTION

The instant invention is therefore directed at a liquid crystal cell comprising at least one transparent front plate, a back plate, and a sealing frame interposed between the two plates, the assembly thus formed defining a tight volume in which is contained a liquid crystal film, one optical characteristic of which is capable of being modified when it is subjected to predetermined phenomena, said volume being divided by at least one separating wall into a main chamber defining an active surface and a secondary chamber defining a passive surface, extending over the full extent of a circumference of the cell, said secondary chamber being partially filled with the liquid crystal and with a gas, the main chamber communicating with the secondary chamber by a plurality of openings provided in the separating wall.

In accordance with the invention, the secondary chamber is divided into a plurality of compartments each of which is in communication with the main chamber by the intermediary of at least one of said openings.

Thus, thanks to this plurality of compartments, each communicating with the main chamber by at least one passage opening, the bubbles are permanently trapped in the extremity of the compartments so that any random movement of these bubbles is considerably reduced and the risk of a trapped bubble moving from the compartment into the main chamber is eliminated.

Moreover, the lengths of the access paths of the liquid crystal contained in the main chamber to the secondary chamber are considerably reduced to facilitate the circulation of liquid crystal. This effectively avoids bubbles forming in the main chamber both during the filling of the cell and when the volume of liquid crystal changes. This is of particular interest when a cell of this type—to which the requisite additional elements could be added (electrodes, mirrors, etc.)—is applied to an automobile rear view mirror.

In a preferred embodiment of the invention, these compartments preferably have a substantially equal volume. For other characteristics and advantages of the invention reference is made to the following non-limiting description of embodiments taken in connection with the appended drawings in which:

DETAILED DESCRIPTION OF THE INVENTION

The following detailed description of a liquid crystal cell of the invention will be given in the context of an application for an automobile rear view mirror and an indicator for an automobile dashboard.

The invention is, of course, not limited to the applications and embodiments described or proposed hereinbelow. For example, the cells of the invention may be used in the conventional manner as an indicator or, without electrodes, with a liquid crystal of the cholesteric type as a thermometer.

Figure 1:
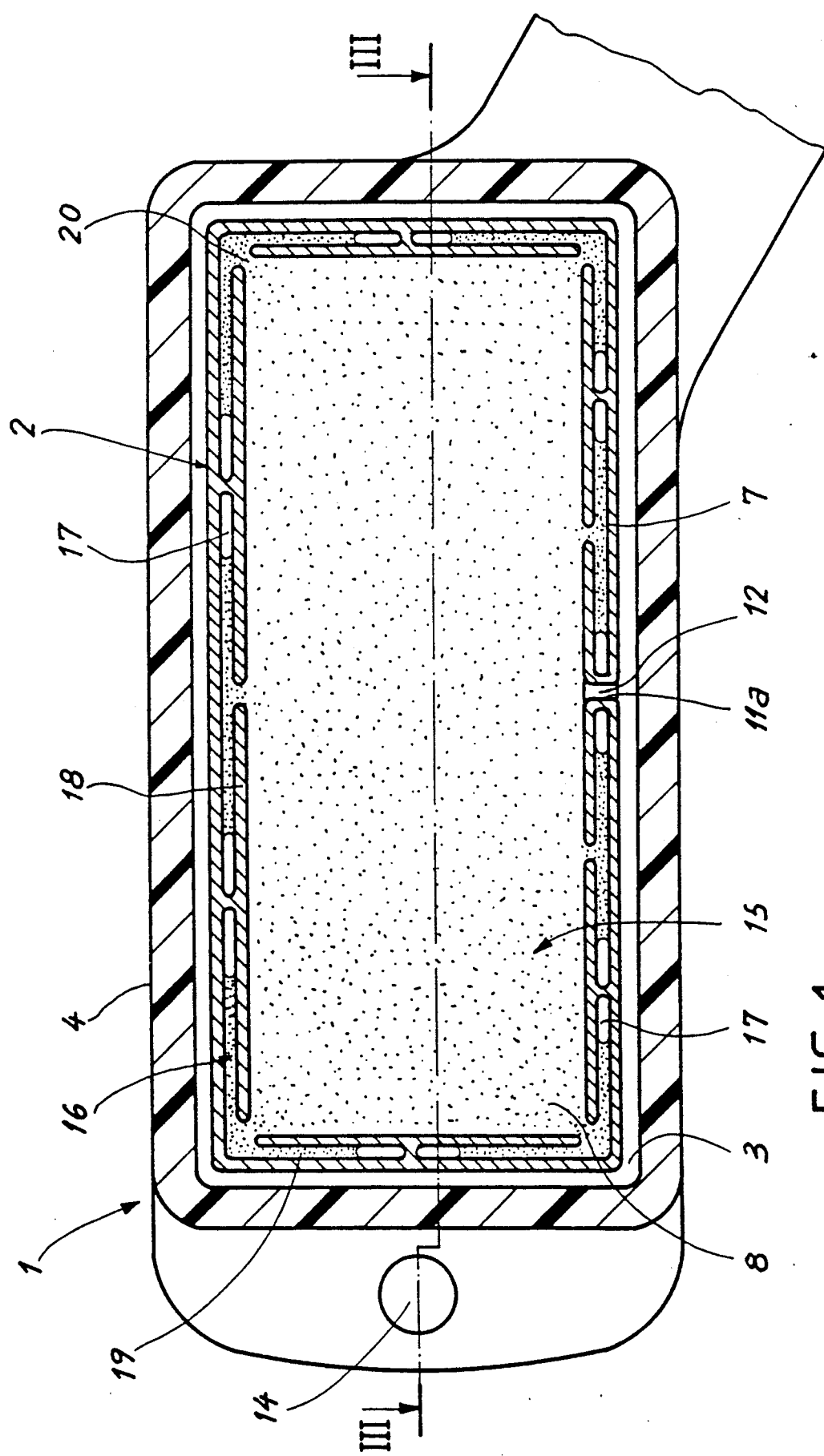
FIGS. 1 and 2 each show a diagrammatic view of the underside of a liquid crystal cell of the invention applied to an automobile rear view mirror having an adjustable light reflection coefficient.
Figure 2:
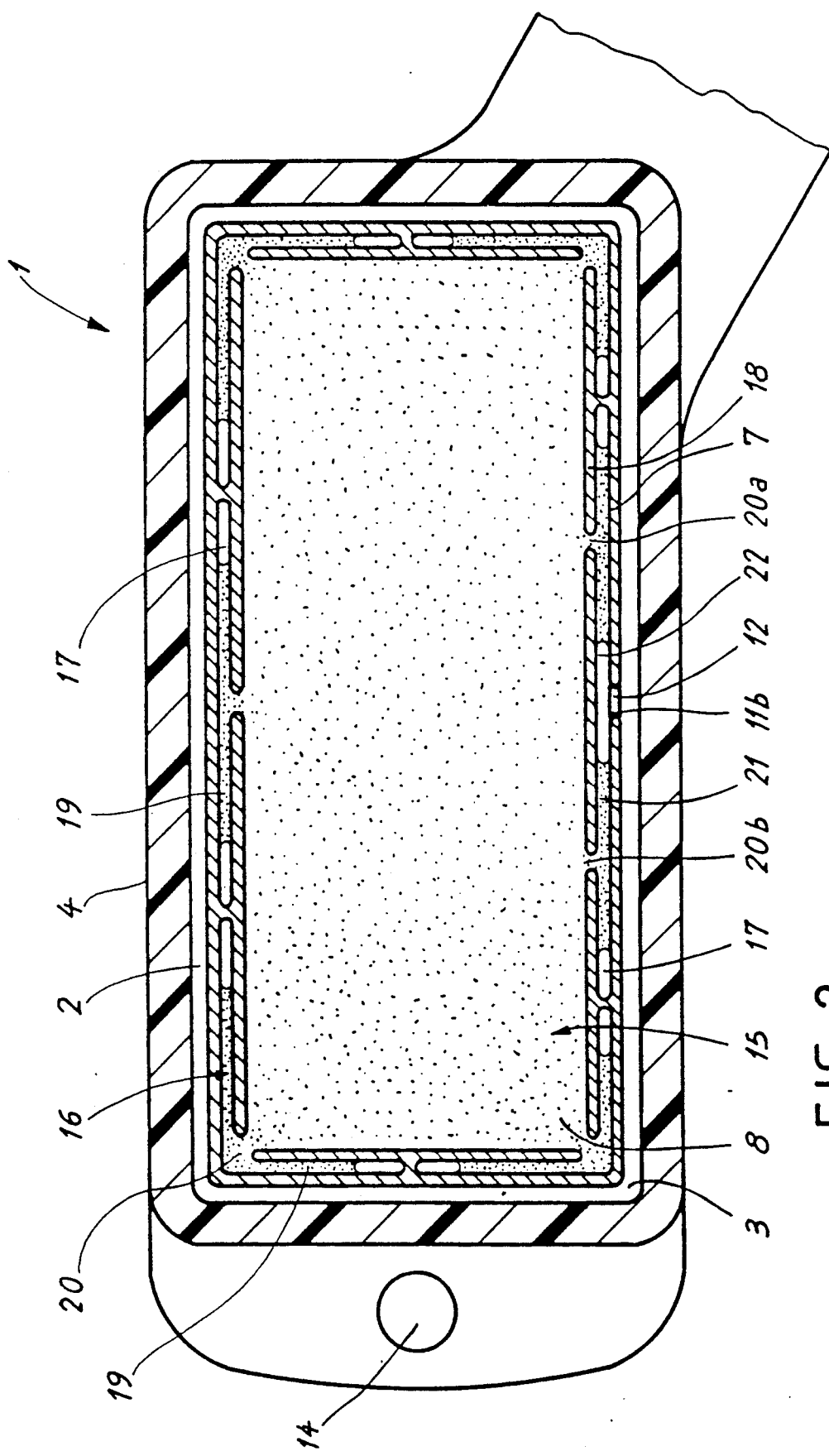
Figure 3:
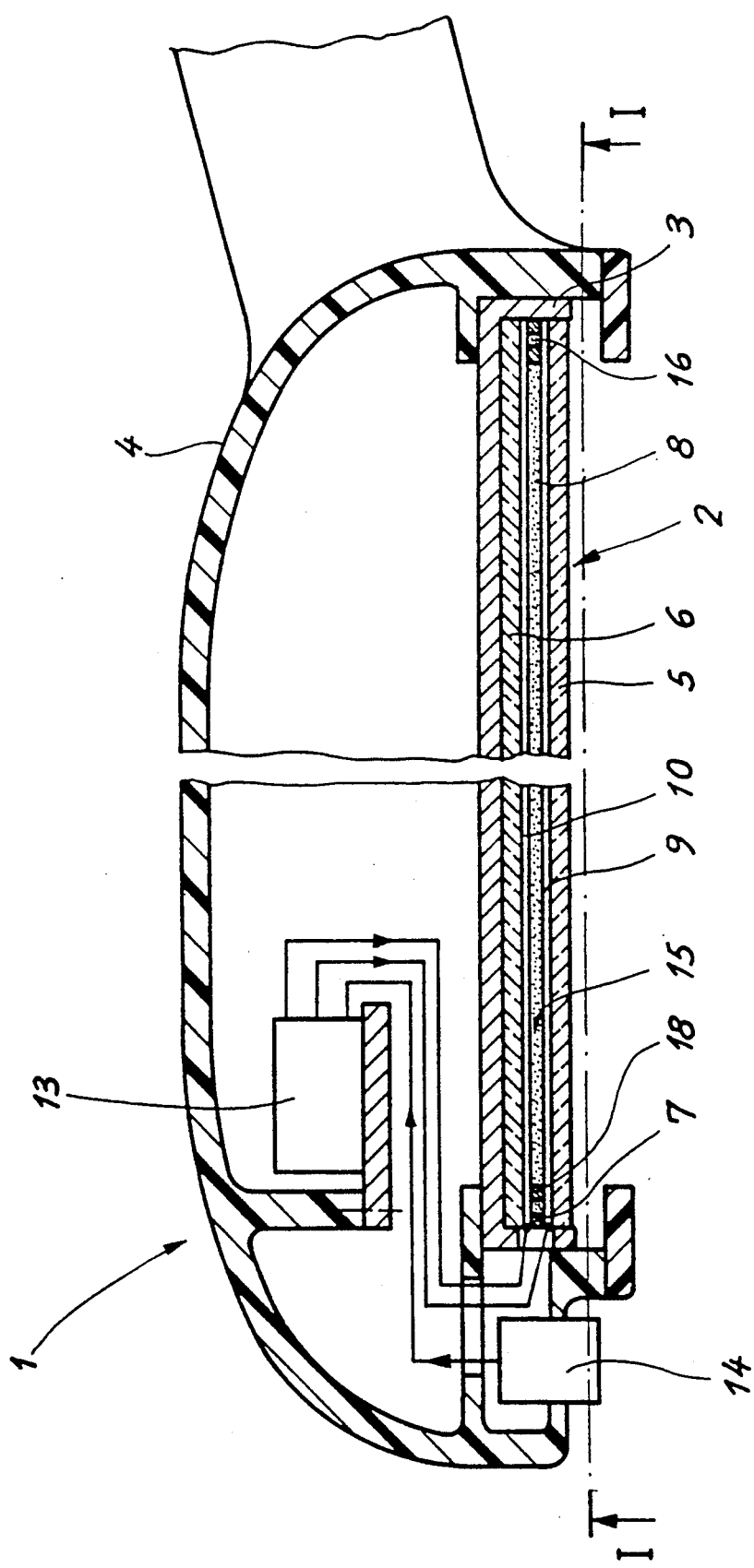
FIG. 3 shows a cross-sectional view of a liquid crystal cell along the line III—III in FIG. 1 and FIGS. 4 and 5 each show a diagrammatic view from above of a liquid crystal cell of the invention applied to a matrix display for an automobile dashboard.

FIGS. 1 to 3 show an automobile rear view mirror designated with the general reference numeral 1 comprising a liquid crystal cell 2 of the invention. For purposes of example, the cell is substantially rectangular in shape.

The cell 2 is mounted in a frame 3, the latter being fixed by means of adhesion in the housing 4 of the rear view mirror 1.

As emerges in particular from FIG. 3, the cell 2 comprises, in known manner, a transparent front plate 5 which has been subjected to anti-reflective treatment and a back plate 6 joined together by a sealing frame 7 defining a tight volume in which is confined a mixture 8 composed of a nematic liquid crystal and a dichroic dye.

The front plate 5 has in its inside face a transparent electrode 9 extending over the entire plate, for example a mixture of indium/tin oxide, as well as an alignment layer (not shown).

In addition, the back plate 6 has over its entire inside face a counter-electrode 10 and a reflecting layer capable of constituting the electrode, and an alignment layer (not shown).

Finally, the cell has a filling opening 11a stoppered with a seam of glue 12 (FIG. 2) after the liquid crystal has been introduced into the cell. An electrical control housing 13 supplied, for example, by a battery comprises an input connected to a photosensitive transducer 14, this housing delivering a control signal representative of the intensity of the light received by the transducer towards two outputs connected to the electrode 9 and the counter-electrode 10 respectively in order to control the degree of absorption of the cell 2.

It should be noted that the drawing does not reflect the exact thickness of the assembly thus created, this thickness being greatly exaggerated for sake of clarity. To give an indication, the distance between the two electrodes may be 5 to 9 μm In accordance with the invention, said tight volume is divided into a main chamber 15 entirely filled with the liquid crystal and a secondary chamber 16 partially filled with the liquid crystal and with a gas in the form of bubbles 17, for example nitrogen. The main chamber 15 defines an active surface of the cell, that is the surface presented to the view of the user, which must be completely free of visible faults such as bubbles, colour variations, etc., whereas the secondary chamber defines a passive surface which is not normally visible when the cell is mounted on a base.

The secondary chamber 16 is defined, on the one hand, by the sealing frame 7 and, on the other hand, by a separating wall forming an inner frame 18 extending along the circumference of the sealing frame 7 at a slight distance from the latter. This secondary chamber forms a channel, the width of which is so selected that gas bubbles 17 are trapped by capillarity during filling. For a cell measuring 150×100 mm, for example, this distance is about 3 mm. The surface of the main chamber 15 is thus delimited by the periphery of the inner frame 18.

It will be noted in this context that the inner frame 18 may advantageously be manufactured at the same time as the sealing frame 7 on the basis of a lay-out and, moreover, that this inner frame reinforces the rigidity of the cell, which is of particular advantage for large cells.

It will also be seen from FIGS. 1 and 2 that partitions extending between frames 7 and 18 divide the secondary chamber 16 is divided into a plurality of compartments 19, each communicating with the main chamber by at least one passage opening 20 to allow the liquid crystal to circulate. These passage openings are of substantially larger dimension than the gap between the plates 5, 6 of the cell, with the result that, when the latter is filled, flow into the various compartments 19 is quick and even. Too small an opening would disrupt flow.

The compartment of the secondary chamber 16 as well as the position of the various passage openings 20 are determined as a function of the geometry of the sealing frame 7 so that, during filling, at least one bubble 17 is preferably trapped in each compartment 19.

In the example described, the passage openings 20 open in the median part of the compartments 19 so that a bubble 17 is trapped in the furthest parts of each compartment and, in view of the rectangular shape, a passage opening is provided in each corner of the inner frame 18. Of course, if the passage openings 20 are arranged at one of the extremities of the compartments, it will easily be understood that one single bubble would form in the latter during filling.

The amount of gas and of liquid crystal contained in each compartment is determined in such a way that, for a variation in maximum volume which the liquid crystal can undergo, a sufficient amount of liquid crystal remains in the compartments for the bubbles to remain trapped therein.

For example, for a cell measuring 150×100 mm capable of being subjected to temperatures ranging from −40° C. to +85° C., the ratio between the volume of the bubbles and the volume of the liquid crystal contained in the compartments may vary in a range between 1/100 to 1/1000, depending on the configuration of the cell.

In addition, it may be seen from FIG. 2 that, according to the invention, the compartment 21 comprising the filling opening 11b communicates with the main chamber 15 via the intermediary of two passage openings 20a, 20b disposed on either side of the filling opening so that, during filling, the liquid crystal 8 flows simultaneously from two separate points. A configuration of this type notably has the advantage of being able voluntarily to create a bubble 22 in the aforementioned compartment at the end of the liquid crystal filling process. The latter is disposed facing the seam of glue 12 sealing the filling opening so as to avoid any possibility of the glue contaminating the liquid crystal.

Figure 4:
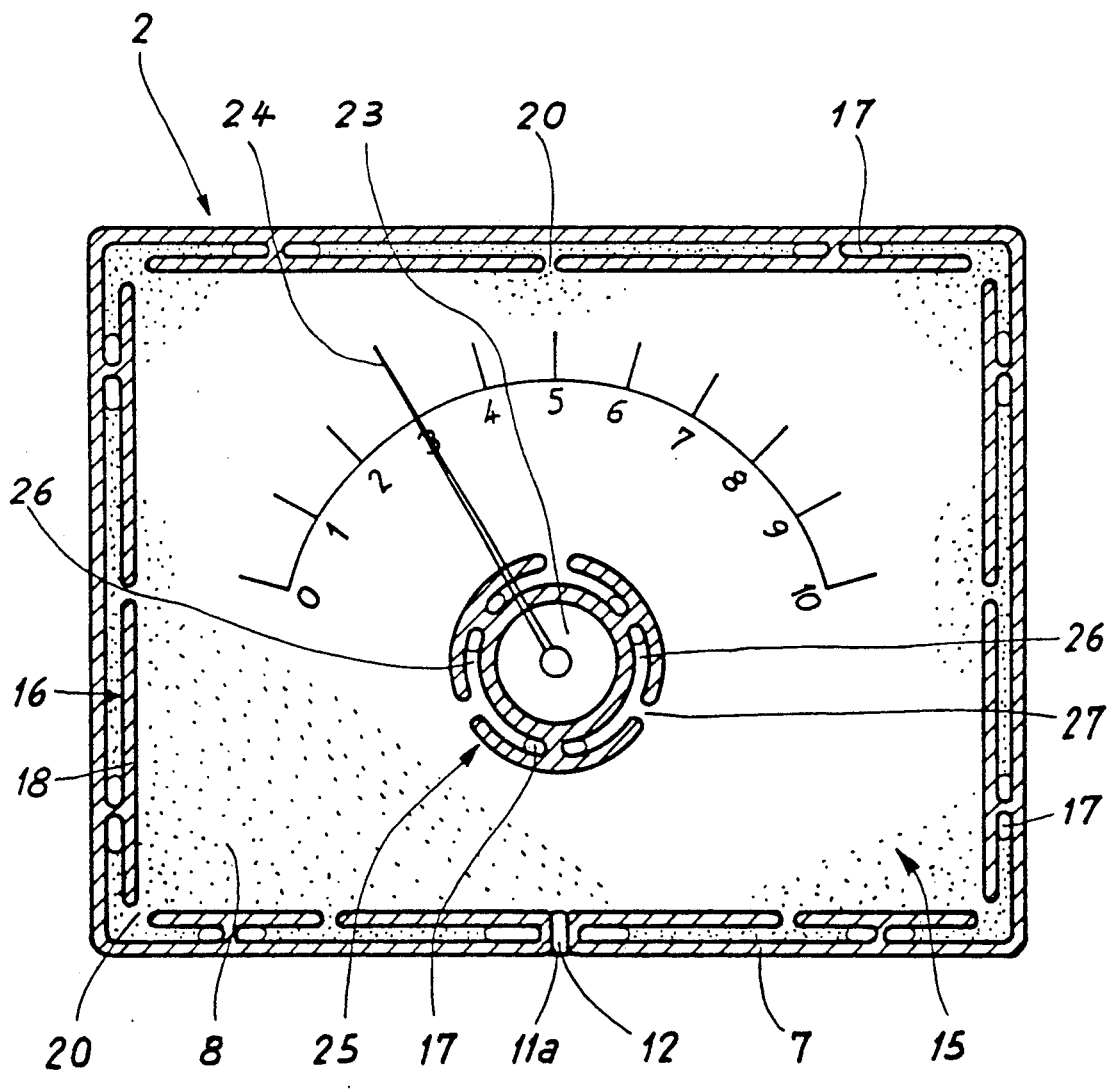
Figure 5:
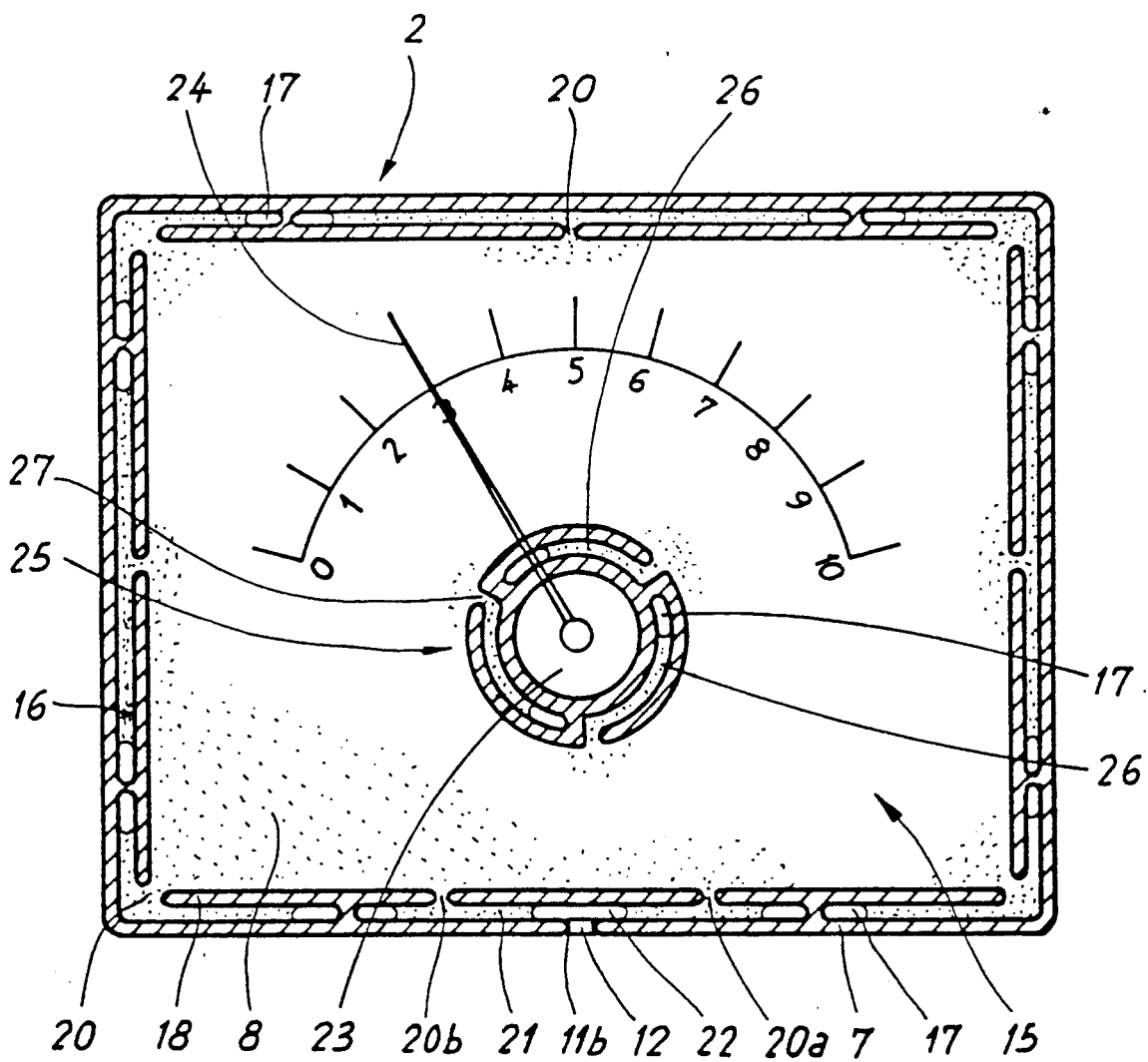

Reference now being made to FIGS. 4 and 5, there are shown two variants of a different embodiment of a cell according to the invention in which the identical elements to those described are designated with the same reference numerals.

The cell 2 shown in FIGS. 4 and 5 is, for example, a matrix display cell of the STN type designed to be fitted into an automobile dashboard. It represents, for example, a speedometer.

The cell 2 comprises, in the central portion, a zone 23 which does not contain any liquid crystal. A central hole is provided in this zone for the passage of a needle 24 capable of being driven by a stepping motor and a gear train placed behind the cell, the needle thus moving along a graduation produced by a suitable control of the liquid crystal cell and, for example, indicates the speed. A liquid crystal cell of this type is described in detail in French patent application FR-88-02591.

In this embodiment the cell comprises a supplementary secondary chamber 25 disposed along the circumference of the zone 23. This chamber 25 is annular in shape and is divided by partitions into three compartments 26, each of these communicating with the main chamber via a passage opening 27; each compartment is partially filled with liquid crystal and by at least one gas bubble. These passage openings 27 may be disposed in the median part of the compartments (FIG. 4) or in an extreme part of the compartments (FIG. 5).

It may be seen from the embodiment in FIG. 4 that the openings 20 communicating with the main chamber are disposed at least in each corner of the cell and, moreover, the filling opening 11a opens directly into the secondary chamber. The sealing frame 7 and the inner frame 18 are joined at this point. Nevertheless, for use within a same range of temperatures or pressures, the ratio of the volume of the bubbles to the volume of liquid crystal contained in the secondary chambers is substantially equal for each embodiment.

The following occurs when the cell is filled (FIG. 2) in accordance with the invention:

The liquid crystal penetrates into the compartment situated opposite the filling hole, entrapping a gas bubble at each extremity of the latter and then the liquid crystal penetrates into the main chamber via the two passage openings provided therefor. The two openings constitute point sources from which the crystal progressively flows into the main chamber. The liquid crystal flow takes the form of two convex profiles, progressively joining to form only a single one. The gas present in the main chamber is driven back and thus fills the various compartments of the secondary chamber before the liquid crystal via the intermediary of the passage openings so that the gas is trapped in the form of bubbles in each compartment.

The passage openings according to the invention, in particular those located in each corner of the inner frame, prevent gas bubble formation at these critical spots. The main chamber is thus completely filled by the liquid crystal, resulting in a faultless active surface.

In addition, a cell according to the invention may be used within a wide temperature range. Should there be a sharp drop in temperature, the liquid crystal would retract whereas the volume of the main and secondary chambers would remain substantially unchanged. However, the main chamber communicates with the secondary chamber by means of a plurality of passage openings, making it possible to compensate the variation in the volume of liquid crystal contained in the main chamber by the liquid crystal contained in the secondary chamber, whereas the volume of bubbles contained in the secondary chamber rises.

The multiplicity of passage openings reduces the length of the path which the liquid crystal contained in the secondary chamber has to travel to compensate for the variation in volume. This results in reliable and rapid compensation and prevents bubble formation in the main chamber.

When the temperature rises, the reverse phenomenon occurs: the liquid crystal dilates and the variation in volume is compensated by the compression of gas bubbles imprisoned in the secondary chamber.

I claim:
1. A liquid crystal cell comprising:
   at least one transparent front plate, at least one back plate, a sealing frame interposed between the two plates to form an assembly defining a tight volume in which is contained a liquid crystal film, at least one separating wall dividing said volumes into a main chamber defining an active surface and a secondary chamber defining a passive surface extending over the full extent of a circumference of the cell, said secondary chamber being partially filled respectively with the liquid crystal film and with a gas, and said main chamber communicating with said secondary chamber through a plurality of openings provided in the separating wall, and partitioning means dividing said secondary chamber into a plurality of compartments each of which is in communication with the main chamber through at least one of said openings.

2. A cell according to claim 1, wherein the volume of the compartments is substantially equal.

3. A cell according to claim 1, wherein the secondary chamber is disposed at the outer periphery of the main chamber of the cell.

4. A cell according to claim 3 further comprising a filling opening traversing the sealing frame, wherein the filling opening communicates directly with the main chamber.

5. A cell according to claim 3 further comprising a filling opening traversing the sealing frame, wherein the filling opening communicates with a compartment comprising two passage openings offset in relation to the filling opening and disposed in the separating wall.

6. A cell according to claim 1, wherein the secondary chamber is defined by the sealing frame, on the one hand and, on the other hand, by said separating wall forming an inner frame extending around the main chamber.

7. A cell according to claim 6, in which the inner frame presents a polygonal configuration, and wherein the passage openings are at least provided in the corners of the inner frame.

8. A cell according to claim 7 further comprising a filling opening traversing the sealing frame, wherein the filling opening communicates directly with the main chamber.

9. A cell according to claim 7 further comprising a filling opening traversing the sealing frame, wherein the filling opening communicates with a compartment comprising two passage openings offset in relation to the filling opening and disposed in the inner frame.

10. A cell according to claim 6 further comprising a filling opening traversing the sealing frame, wherein the filling opening communicates directly with the main chamber.

11. A cell according to claim 6 further comprising a filling opening traversing the sealing frame, wherein the filling opening communicates with a compartment comprising two passage opening offset in relation to the filling opening and disposed in the inner frame.

12. A cell according to claim 1, wherein the openings open substantially into the median part of the compartments.

13. A cell according to claim 12 further comprising a filling opening traversing the sealing frame, wherein the filling opening communicates directly with the main chamber.

14. A cell according to claim 1, wherein the passage openings are regularly spaced around the main chamber.

15. A cell according to claim 1 further comprising a filling opening traversing the sealing frame, wherein the filling opening communicates directly with the main chamber.

16. A cell according to claim 1 further comprising a filling opening traversing the sealing frame, wherein the filling opening communicates with a compartment comprising two passage openings offset in relation to the filling opening and disposed in the separating wall.

17. A cell according to claim 1 further comprising a zone not containing any liquid crystal, a supplementary second chamber, and partitioning means dividing said supplementary secondary chamber into a plurality of compartments disposed along the circumference of said zone.

18. A cell according to claim 1 wherein the plates are provided on their opposite faces with an electrode joined to an electrical control device.

19. A cell according to claim 1 wherein said secondary chamber forms a channel having a width providing capillarity for trapping bubbles of said gas in said secondary chamber.

20. An automobile rear view mirror comprising at least one element for producing a signal representing the intensity of light reaching it, an electrical control device, and a liquid crystal cell, said cell comprising:

at least one transparent front plate, at least one back plate comprising a reflective coating, a sealing frame interposed between the two plates to form an assembly defining a tight volume in which is contained a liquid crystal film, at least one separating wall dividing said volume into a main chamber defining an active surface and a secondary chamber defining a passive surface extending over the full extent of a circumference of the cell, said secondary chamber being partially filled respectively with the liquid crystal film and with a gas, and said main chamber communicating with said secondary chamber through a plurality of openings provided in the separating wall, partitioning means dividing said second chamber into a plurality of compartments each of which is in communication with the main chamber through at least one of said openings, and electrodes on opposing faces of said plates, said electrodes and said at least one signal producing element being connected to said control device for causing said liquid crystal film to change the transparency of the cell in response to said signal.

21. A matrix display device of the STN type comprising a liquid crystal cell, said cell comprising:

at least one transparent front plate, at least one back plate, a sealing frame interposed between the two plates to form an assembly defining a tight volume in which is contained a liquid crystal film, at least one separating wall dividing said volume into a main chamber defining an active surface and a secondary chamber defining a passive surface extending over the full extent of a circumference of the cell, said secondary chamber being partially filled respectively with the liquid crystal film and with a gas, and said main chamber communicating with said secondary chamber through a plurality of openings provided in the separating wall, partitioning means dividing said secondary chamber into a plurality of compartments each of which is in communication with the main chamber through at least one of said openings, and electrodes provided on opposing faces of said plates and connected to an electrical control device.

* * * * *